United States Patent Office 3,692,677
Patented Sept. 19, 1972

3,692,677
GREASES THICKENED WITH QUINACRIDONE PIGMENTS
Garth M. Stanton, San Anselmo, and John L. Dreher, Kensington, Calif., assignors to Chevron Research Company, San Francisco, Calif.
No Drawing. Filed May 18, 1970, Ser. No. 38,549
Int. Cl. C10m 5/02, 5/20
U.S. Cl. 252—25                                                                9 Claims

ABSTRACT OF THE DISCLOSURE

A composition comprising greases thickened with substituted or unsubstituted quinacridone pigments.

BACKGROUND OF THE INVENTION

Field of the invention

This invention relates to greases thickened with organic pigments.

Description of the prior art

It has been known for some years that organic pigments may be used as thickeners in lubricating oils to produce greases. A typical example is the use of the perinone pigment Vat Orange 7 described in Pat. No. 3,102,860. Indanthrene pigments as grease thickeners are disclosed in U.S. Pats. 2,848,417, 2,915,470 and 3,006,851. Metal-free phthalocyanine-thickened greases are described in U.S. Pat. 2,432,432.

There are many references to the quinacridones as compounds in Chemical Abstracts. These references disclose both the unsubstituted and numerous substituted quinacridones. U.S. Pats. 2,844,484; 2,844,485, and 2,844,581 disclose quinacridones as red and violet pigments. The particular color obtained is a function of the crystal structure of the quinacridone. U.S. Pat. 2,913,348 describes the combination of quinacridone pigments with basic nickel carbonate.

SUMMARY OF THE INVENTION

The subject of this invention is a grease composition comprising an oil of lubricating viscosity and, in an amount sufficient to thicken said oil, at least one unsubstituted or substituted quinacridone.

DETAILED DESCRIPTION OF THE INVENTION

In its broadest form the composition of this invention is a grease comprising an oil of lubricating viscosity and, in an amount sufficient to thicken said oil, at least one substituted or unsubstituted quinacridone.

The quinacridones: Characteristics

As used herein, the term "quinacridone" refers to compounds of the class having the formula:

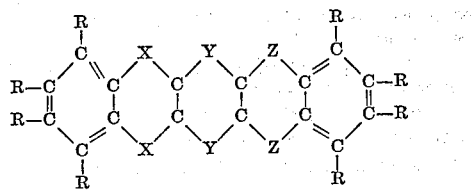

wherein
(1) one X and one Z are each

and the other X and other Z are each

(2) each Y is

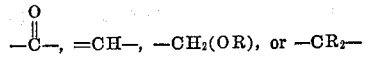

and the Y's may be the same or different; and
(3) each R represents a monovalent radical selected from the group consisting of hydrogen, halogen, $C_1$–$C_6$ alkyl, cycloalkyl of less than 8 carbon atoms, or phenyl or $C_1$–$C_3$ alkyl)phenyl radicals. The $C_1$–$C_3$ alkyl, cycloalkyl, phenyl, or ($C_1$–$C_3$ alkyl)phenyl may be substituted with a single hydroxy or carbonyl group. The various R's may be the same or different, and will have a maximum of 9 carbon atoms.

It is preferred that each Y be

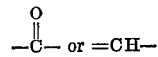

and that each R be hydrogen, halogen, or an unsubstituted $C_1$–$C_6$ alkyl radical. It is further preferred that each Y be =CH— and that each R be a hydrogen, halogen, methyl or ethyl radical.

The principal compounds useful as grease thickeners in this invention are the linear trans-isomer quino(2,3-b)acridine-7,14-dione.

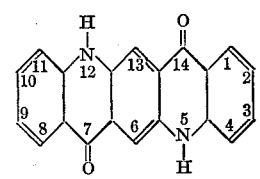

and its companion cis-isomer quino(3,2-b)acridine-7,14-dione

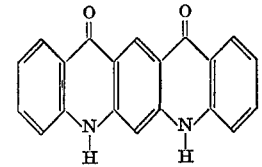

Representative quinacridone compounds include, in addition to quino(2,3-b)acridine-7,14-dione and quino(3,2-b)acridine-7,14-dione, the compounds in the list below. Substituent numbering is in accordance with the numbering scheme shown for compound I above, and for compound No. 6260 on p. 893 of the Ring Index, 2nd edition: American Chemical Society, 1960. For brevity, each example shows only the (2,3-b), i.e., trans-isomer; this invention, however, comprehends both the cis- and trans-isomers in all cases.

quino(2,3-b)6,13-dihydroacridine-7,14-dione,
quino(2,3-b)2-methylacridine-7,14-dione, quino(2,3-b)2,9-dimethylacridine-7,14-dione,
quino(2,3-b)3,10-dimethylacridine-7,14-dione,
quino(2,3-b)4,11-dimethylacridine-7,14-dione,
quino(2,3-b)1,2,8,9-tetramethylacridine-7,14-dione,
quino(2,3-b)4,11-diisopropylacridine-7,14-dione,
quino(2,3-b)2,9-dicyclohexylacridine-7,14-dione,
quino(2,3-b)2,9-diphenylacridine-7,14-dione,
quino(2,3-b)6-hydroxyacridine-7,14-dione,
quino(2,3-b)2,9-dimethyl-6-hydroxyacridine-7,14-dione,
quino(2,3-b)1,8-dimethoxy-13-hydroxyacridine-7,14-dione,
quino(2,3-b)6,13-dihydro-6,13-dihydroxyacridine-7,14-dione,
quino(2,3-b)2,9-dimethoxyacridine-7,14-dione,
quino(2,3-b)1,4,8,11-tetramethoxyacridine-7,14-dione,
quino(2,3-b)2,9-diethoxyacridine-7,14-dione,
quino(2,3-b)4,11-diphenoxyacridine-7,14-dione,
quino(2,3-b)6-acetoxyacridine-7,14-dione,
quino(2,3-b)2,9-difluoroacridine-7,14-dione,
quino(2,3-b)1,4,8,11-tetrafluoroacridine-7,14-dione,
quino(2,3-b)2,9-difluoro-13-hydroxyacridine-7,14-dione,
quino(2,3-b)2-chloroacridine-7,14-dione,
quino(2,3-b)1,2,4,8,9,11-hexachloroacridine-7,14-dione,
quino(2,3-b)2-chloro-4-methylacridine-7,14-dione,
quino(2,3-b)2-chloro-8,9-diphenylacridine-7,14-dione,
quino(2,3-b)2,9-dichloro-6-hydroxyacridine-7,14-dione,
quino(2,3-b)1,3,8,10-tetrabromoacridine-7,14-dione,
quino(2,3-b)2,4,9,11-tetraiodoacridine-7,14-dione,
quino(2,3-b)1,8-dimethylacridine-6,7,13,14-tetrone,
quino(2,3-b)4,11-dimethylacridine-6,7,13,14-tetrone,
quino(2,3-b)3,10-diphenylacridine-6,7,13,14-tetrone,
quino(2,3-b)1,8-dimethoxyacridine-6,7,13,14-tetrone,
quino(2,3-b)2,9-difluoroacridine-6,7,13,14-tetrone,
quino(2,3-b)2,4,9,11-tetrachloroacridine-6,7,13,14-tetrone, etc.

Each quinacridone compound may be used alone as a grease thickener, or each may be used in combination with its respective cis- or trans-isomer. Either or both may be used in mixtures with other quinacridone compounds without regard to isomerism.

Many of the above compounds and others not listed but included within the scope of this invention can exist in two or more crystalline forms. An example is quino(2,3-b)acridine-7,14-dione, which may exist in $\alpha$-, $\beta$- and $\gamma$-crystalline forms. While these crystalline forms will determine the color of the particular quinacridone, they do not have a significant effect on the properties of the quinacridone as a grease thickener. Consequently, throughout this specification, discussion of the quinacridone compounds will be without reference to any particular crystalline form.

The quinacridones: Preparation

Some of the quinacridone compounds are available commercially. These and others may be prepared by reaction schemes described in the literature. Typical of such reactions is one described in U.S. Pat. 2,844,484 in which 2,5-dianilino-3,6-dihydro-terephthalate is heated in a nitrogen atmosphere at approximately 250° C. for one hour in a mixture of 23.5 percent biphenyl and 76.5 percent diphenyl ether to produce quino(2,3-b)6,13-dihydroacridine-7,14-dione. If desired, this material may be dehydrogenated by refluxing at 108° C. for two hours with water, ethylene glycol, sodium hydroxide and sodium m-nitrobenzene sulfonate to produce quino(2,3-b)acridine-7,14-dione. Analogous cis-isomers can be produced by similar reactions of 4,6-dianilino-2,5-dihydroisophthalate. In each case, the substituents on the terephthalate or isophthalate and the aniline are chosen such that the quinacridone product will have the desired substituents. These preparation schemes are illustrative only, and are not meant to be limiting, for this invention does not encompass preparation of the quinacridones but, rather, is limited to the use of the quinacridones in greases.

To be a satisfactory grease-thickening agent, the quinacridone should be in finely divided form. Final particle size should not exceed an average of about 10 microns. Particle size of the quinacridone should preferably be in the range of 2 to 10 microns, with a number average particle size of approximately 1 micron or less. Since in their prepared form quinacridones are commonly solid crystalline materials, comminution may be accomplished by a variety of methods including crushing, grinding, etc., in such apparatus as ball mills, roller mills, etc. In a typical example described in U.S. Pat. 2,844,484, quino(2,3-b)acridine-7,14-dione crystals are mixed with sodium chloride, nails and iron bars, and ground until the surface area of the quinacridone $\alpha$-phase crystals is about 68 square meters per gram.

The lubricating oil base

The preferred oils of lubricating viscosity in the greases of this invention are perfluoropolyethers. The polymers are comprised of monomer units of 2 to 8 carbon atoms, with the preferred materials being prepared from 2 to 3 carbon atom monomers. In order that the materials be of proper consistency for fluid bases for the greases, it is preferred that there be no more than about 35 monomer units. Reference to the polymers and their preparation may be found in U.S. Pats. 3,214,478, 3,242,218, 3,257,466, and 3,274,239. Although the preferred polymers consist entirely of perfluorocarbonether monomer units, materials which are capped by other groups are suitable. A description of the preferred materials, which are Du Pont PR-143 fluids, may be found in ASLE Paper No. 65LC-3, Lubrication Conference, October 18–20, 1965, Academic Press, entitled, "PR-143—A New Class of High Temperature Fluids," by W. H. Gumpricht. These fluids are colorless and odorless, have high densities and low indices of refraction. The fluids are basically polymers of hexafluoropropylene oxide.

If desired, however, other lubricating oils may be used as the base for the greases of this invention. These include naphthenic-base, paraffin-base, and mixed-base lubricating oils; other hydrocarbon lubricants, e.g. lubricating oils derived from coal products; and synthetic oils, e.g., alkylene polymers (such as polymers of propylene, butylene, etc., and the mixtures thereof), alkylene oxide-type polymers (e.g., alkylene oxide polymers prepared by polymerizing alkylene oxide, e.g., propylene oxide polymers, etc., in the presence of water or alcohols, e.g., ethyl alcohol), carboxylic acid esters (e.g., those which were prepared by esterifying such carboxylic acids as adipic acid, azelaic acid, suberic acid, sebacic acid, alkenylsuccinic acid, fumaric acid, maleic acid, etc., with the alcohols, such as butyl alcohol, hexyl alcohol, 2-ethylhexyl alcohol, pentaerythritol, etc.), liquid esters of acids of phosphorus, alkylbenzenes, polyphenyls (e.g., biphenyls and terphenyls), albylbiphenyl ethers, and polymers of silicon (e.g., tetraethyl silicate, tetraisopropyl silicate, tetra (4-methyl-2-tetraethyl) silicate, hexyl (4-methyl-2-pentoxy) disiloxane, poly(methyl) siloxane, and poly(methylphenyl) siloxane, etc.).

The various oils, where compatible, may be used as mixtures. The oils in a given mixture should be mutually miscible or be capable of being made so by the use of appropriate solvents.

The greases of this invention

The greases of this invention are produced by milling the comminuted quinacridone into the base fluid of the grease. The quinacridone should be present as 5 to 25 weight percent of the finished grease, and preferably about 8 to 18 weight percent. Typical methods of mixing the base fluid and the quinacridone include mechanical devices such as paint mills, colloid mills, pressure extrusion devices, etc. If desired, a dispersing agent such as an aromatic solvent for the quinacridone may be used and then removed by evaporation following formation of the grease.

Small amounts of additives to enhance particular properties of the grease may be added if desired. These may be present in up to 10 weight percent of the finished grease and must not be incompatible with either the quinacridone or the grease base fluid. A typical additive is sodium nitrite, which is used in amounts from about 0.1 to 5.0 percent by weight.

Basic nickel carbonate is often present in commercial supplies of quinacridone compounds. It serves as a color stabilizer when the quinacridone is used as a pigment; this function is described in U.S. Pat. 2,913,348. Since it does not appear to have a significant beneficial effect on grease properties, its concentration in the grease should be limited to about 0.1–10 parts by weight (approximately 0.5–6 parts by weight nickel) per 100 parts of quinacridone.

The following examples will illustrate the greases of this invention. All parts and percentages are by weight. The bearing life tests of the samples showed wide variations in the values obtained. In each example below the values shown are averages of two tests.

Example 1

13 percent of quino(2,3-b)acridine-7,14-dione, having a γ crystal structure and a particle size of less than 1 micron (commercially available under the trademark "Monastral Red Y" from Du Pont) was milled into 87 percent of a perfluoropolyether fluid (commercially available under the trademark "Krytox 143 AC" from Du Pont) to produce an NLGI Grade 2 Grease (ASTM worked penetration at 77° F.: 286). This grease was run in a bearing test which was a modification of Federal Test Method Standards No. 791a, Method 331.1: heat-treated bearings were used and the test was run at 500° F. The bearing life was 768 hours.

Example 2

11 percent of the same quinacridone compound having a γ crystal structure, having a particle size of greater than 1 micron, and containing approximately 9 parts of basic nickel carbonate per 100 parts of quinacridone (commercially available from Du Pont under the trademark "Monastral Red B"), was blended with 89 percent of the "Krytox 143 AC" perfluoropolyether to produce an NLGI Grade 2 Grease having a worked penetration of 294. In the modified bearing test described in Example 1, the grease was found to have a bearing life of 691 hours.

Example 3

11 weight percent of the same quinacridone compound, having a β crystal structure, and containing approximately 8.5 parts of basic nickel carbonate per 100 parts of quinacridone (commercially available from Du Pont under the trademark "Monastral Violet R"), was blended with "Krytox 143 AC" perfluoropolyether to produce an NLGI Grade 2 Grease, having a worked penetration of 294. In the modified bearing test described in Example 1, the grease was found to have a bearing life of 530 hours.

These examples illustrate the utility of the greases of this invention and their good stability characteristics under high-temperature conditions. Such greases find use in high-speed bearing applications and in service where severe temperature conditions may be encountered.

The above examples are intended to be illustrative only. It is apparent that there are many embodiments within the scope and spirit of this invention. Consequently, the scope is to be limited only by the appended claims.

What is claimed is:

1. A grease composition comprising an oil of lubricating viscosity, and, in an amount sufficient to thicken said oil, at least one quinacridone.

2. The grease composition of claim 1 wherein said quinacridone is a compound of the formula:

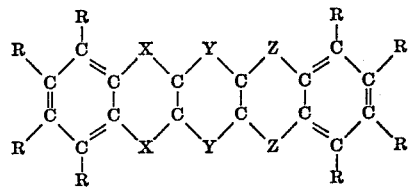

wherein
(1) one X and one Z are each

and the other X and the other Z are each

(2) each Y is

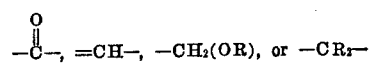

and
(3) each R is a monovalent radical selected from the group consisting of hydrogen, halogen, and substituted or unsubstituted $C_1$–$C_6$ alkyl, substituted or unsubstituted cycloalkyl of less than eight carbon atoms, substituted or unsubstituted phenyl; wherein the substituents are hydroxy, carbonyl, or $C_1$–$C_3$ alkyl groups.

3. The grease composition of claim 2 wherein each Y is

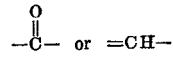

and each R is hydrogen, halogen, or an unsubstituted $C_1$–$C_6$ radical.

4. The grease composition of claim 3 wherein each Y is =CH— and each R is a hydrogen, halogen, methyl, or ethyl radical.

5. The grease composition of claim 2, wherein said quinacridone is quino(2,3-b)acridine-7,14-dione, quino-(3,2-b)-acridine-7,14-dione, or a mixture of the two.

6. The grease composition of claim 2, wherein said quinacridone comprises 5–25 weight percent of the finished grease.

7. The grease composition of claim 6, wherein said quinacridone comprises 8–18 weight percent of the finished grease.

8. The grease composition of claim 1, further comprising 0.1–5.0 percent by weight of sodium nitrite.

9. The grease composition of claim 1, further comprising 0.1–10 parts by weight of basic nickel carbonate per 100 parts by weight of said quinacridone.

References Cited

UNITED STATES PATENTS

| | | | |
|---|---|---|---|
| 3,432,432 | 3/1969 | Dreher | 252—25 |
| 2,913,348 | 11/1959 | Jackson | 252—18 |
| 2,844,484 | 7/1958 | Reidinger et al. | 252—18 |

PATRICK P. GARVIN, Primary Examiner

I. VAUGHN, Assistant Examiner

U.S. Cl. X.R.

252—51.5 R